United States Patent
Chen

[11] Patent Number: 6,058,187
[45] Date of Patent: May 2, 2000

[54] SECURE TELECOMMUNICATIONS DATA TRANSMISSION

[75] Inventor: Tsuhan Chen, Middletown, N.J.

[73] Assignee: AT&T Corp., Middletown, N.J.

[21] Appl. No.: 08/842,784

[22] Filed: Apr. 17, 1997

[51] Int. Cl.$^7$ .............................. H04L 9/08; H04L 9/00; H04L 9/30; H04L 9/32
[52] U.S. Cl. ............................... 380/21; 380/9; 380/18; 380/23; 380/25; 380/30; 380/49
[58] Field of Search .................. 380/9, 21, 23, 380/25, 28, 49, 50, 59, 18, 30

[56] References Cited

U.S. PATENT DOCUMENTS

| | | | |
|---|---|---|---|
| 4,200,770 | 4/1980 | Hellman et al. | |
| 4,218,582 | 8/1980 | Hellman et al. | |
| 4,405,829 | 9/1983 | Rivest et al. | |
| 4,424,414 | 1/1984 | Hellman et al. | |
| 4,995,082 | 2/1991 | Schnorr | 380/23 |
| 5,202,920 | 4/1993 | Takahashi | 380/18 |
| 5,231,668 | 7/1993 | Kravitz | 380/28 |
| 5,241,595 | 8/1993 | Kuno | 380/18 |
| 5,406,619 | 4/1995 | Akhteruzzaman et al. | 380/23 X |
| 5,524,072 | 6/1996 | Labaton et al. | 380/25 X |
| 5,583,933 | 12/1996 | Mark | 380/9 X |
| 5,818,937 | 10/1998 | Watson | 380/25 |

FOREIGN PATENT DOCUMENTS

| | | | |
|---|---|---|---|
| 0 602 335 A2 | 1/1993 | European Pat. Off. | H04L 9/08 |
| 2 293 719 | 9/1994 | United Kingdom | H04K 1/100 |

OTHER PUBLICATIONS

Notification of Transmittal of The International Search Report or the Declaration—International Application No.: PCT/US98/03582—Filing date Feb. 24, 1998.

*Primary Examiner*—Bernarr E. Gregory

[57] ABSTRACT

Secure data transmission apparatus comprises a data translator for translating an input string of signals, each signal having incomplete information for identifying an alphanumeric character, into a first encryption key. A data encrypter receives a first encryption key, a choice of encryption algorithm and a message and outputs an encrypted message according to the selected algorithm. The apparatus may be applied whenever the user is confronted with telecommunications apparatus that provides a limited input capability and no means for encrypting a message for transmission to an end user. In this manner, for example, a user may authenticate their name for display on caller identification plus name apparatus and the called party can be assured, before answering their line, that the call is from the party having the displayed name.

21 Claims, 2 Drawing Sheets

SECURE TELECOMMUNICATIONS DATA TRANSMISSION

BACKGROUND OF THE INVENTION

1. Technical Field

This invention relates to the field of encryption systems and applications thereof and, in particular, to a telecommunications application in which a user may encrypt information prior to secure transmission to a remote destination.

2. Description of the Background Art

Two key encryption systems are known in which a user of the encryption technique secures data to be transmitted such that upon reception a second key is used to decrypt the encrypted data. A pirate intercepting the transmitted data is unable to decrypt the encrypted data without having access to the second key. One such standard for Internet security is advanced by a number of On-line Internet services and RSA Data Security who would want to unify "Secure HTTP" (developed by Netscape) and SSI (developed by RSA). RSA in partnership with Cylink, the partnership known as PKP, holds U.S. Pat. Nos. 4,200,770; 4,218,582, 4,405,829, 4,424,414 and 4,995,082. These patents describe a private key/public key system where the user maintains a private key and shares a related public key with those with whom he is exchanging secure information.

The United States National Institute of Standards and Technologies, N.I.S.T., has also recommended a private key/public key standard related to the PKP proposal known as the DSS (digital signature standard algorithm) encryption/decryption algorithm, described and announced in the May 19, 1994, FIPS PUB 186. N.I.S.T. holds U.S. Pat. No. 5,231,668 to Kravitz on the digital signature algorithm. Given a message m, the message m along with a signature comprising a public key value and a hashing value s are transmitted to the far end where they are tested to verify the authenticity of the message. A pirate who does not know the private key cannot alter any "signed" message.

Many entities have proposed applications software packages that may be purchased for use on personal computers for the purpose of providing secure data transmission. An example of one such package is the AT&T "Secret Agent" software package, a public key/private key form of encryption algorithm similar to the PKP proposal. Another package commonly used today is so-called pretty good encryption or PGP which is reasonably available to users.

There are many potential applications of two key encryption systems in data telecommunications generally. For example, these may be categorized as personal computer to personal computer, person to person, and telecommunications apparatus to telecommunications apparatus and combinations of these. For example, in an Internet link to a database service, the user typically is equipped with a personal computer and modem and the far end server is also represented by a computer. When a user is remote from their personal computer, the user, not having a keyboard or cursor, is limited to a limited keypad such as a two tone key pad or voice input. Also, the party to whom the user connects over telecommunications facilities may be equipped only with a caller identification display device. In these latter situations, for example, if the user is trying to assure the recipient that the data to be transmitted originated with the user, the facilities may be limited in how the user "signs" the data by encrypting it and identifying to the remote party how the data is encrypted and how to decrypt it. In many situations, a user would want to "sign" their name, credit card data, authorization for banking transactions and the like without having to resort to carrying around a personal computer with them.

Thus, all of the known proposals describe different forms of keys that may be used to encrypt data prior to transmission but fail to describe particular applications of such encryption techniques, for example, when the user is not equipped with a personal computer or other sophisticated equipment for transmitting data securely over telecommunications facilities. A user at a pay telephone terminal, for example, has limited means for encrypting data by "signing" it as his own to permit a recipient to verify its authenticity.

SUMMARY OF THE INVENTION

In accordance with the principles of the present invention, a user may carry with them or otherwise obtain access to, for example, by dial-up access and voice input, a translator for translating alphanumeric characters into tone sequences, for example, two tones, for coding an encryption key into signals that can be recognized by standard telecommunications equipment. Because so-called "touch-tone" signals comprise two tone values and only twelve different combinations from a three by four keypad matrix are possible, the device translates two such pairs of tones into up to 144 different alphanumeric characters. In that manner, a user may use the translator to enter alphanumeric encryption keys, control data and messages for secure transmission to a remote party.

The translator may perform an encryption function as well. In the alternative, the encryption function may be maintained remote from the user and in the telecommunications network. When a user wishes, for example, to transmit a message such as their name, credit card number or other data that they would wish to secure for transmission to a remote destination, the user enters their first encryption key of a two or more key encryption system followed by a code representing the encryption standard chosen and the data they wish to encrypt. In advance, the user is assumed to have shared their public key with the recipient of the message. If not, the public key may be entered by the user after the message. Each of the data strings may be separated by known characters such as # key entries. The encryption device capable of performing any of the known encryption techniques decodes the entered data, performs the encryption of the message and outputs the encrypted message followed a code value indicating the encryption method used, if necessary, and the public key, if necessary. The telecommunications system may receive the key, the control data and the message and forward these to the remote destination or to telecommunications apparatus that may require the data. The telecommunications apparatus at a terminating end may receive the data and authenticate the called party's identity and signature, provide the decrypted data and in an output to a display assure that the data is authentic by flashing or other authenticity indicator or provide the encrypted data and control data directly to the user's apparatus. Again, the device or the system accepts these data, encrypts or "signs" the message prior to transmission and forwards the message and the "public key" to the apparatus of the remote party or shared via the telecommunications network which can decrypt the message and authenticate the identity of the sender.

Other advantages and features of the present invention will become known from reading the detailed description of the invention which follows.

DETAILED DESCRIPTION

Figure 1:
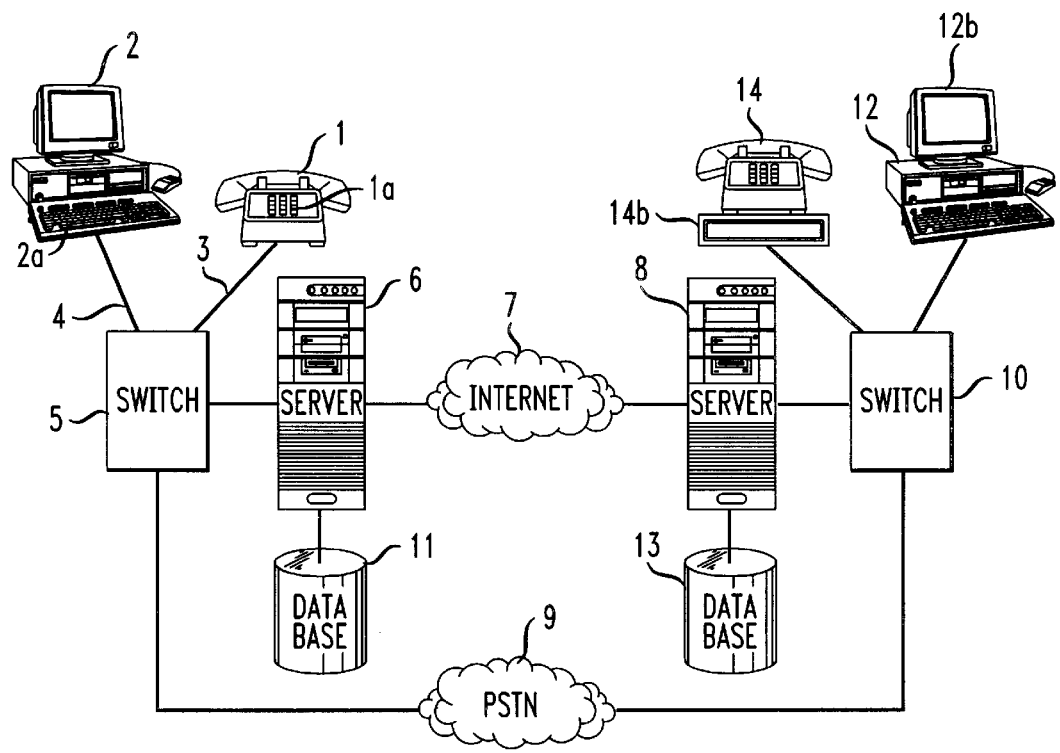
FIG. 1 is an overview of a telecommunications system in which the present invention may be used to advantage.

Referring to FIG. 1, there is shown an overview of a telecommunications network in which the present invention may be utilized. The present invention may also find application in an Internet network environment, also described by FIG. 1. The problem of the present invention is described by way of first describing a typical personal computer to personal computer call. In this situation computer 2, for example, equipped with encryption software A (not shown) simply dials up computer 12 also equipped with the same package A. Package A may be pretty good encryption (PGP), a package offered by a software vendor or other package typically based on one of the many encryption algorithms available such as DSA, PKP or other algorithm choice. If both computers are similarly equipped, that is, the transmitting computer 2 has a full keyboard 2a and the receiving computer 12 has a display 12b and each has the software and knows their respective private and public keys, the transmission of a message should proceed without any problem. The choice of Internet or telecommunications network of an encrypted message is invisible to the message transmission. The computer addresses by E-Mail or dials by dial signaling the remote computer and, once the link is established, both computers can operate together to verify to the recipient at computer 12 that the message sent from computer 2 is authentic and originated from the sender.

On the other hand, apparatus 1 may be at the premises of another person or may be a pay telephone station. One who would want to send a personal message may be at a disadvantage on at least two counts. First, they may not have a keyboard like full keyboard 2a; they are limited by keypad 1a, typically, a 3×4 matrix of inputs. Secondly, they may have no encryption algorithm processor apparatus like computer 2. In making a call to a subscriber at terminal 14 or 12, the user at station 1 cannot identify themselves to the recipient as to their identity or sign any message. A database 11 is known for performing a translation of a dialed-in telephone number or credit card number to the name of the holder of that number or card. The name data can be sent through the public switched telephone network 9 and displayed on caller identification display device 14b. On the other hand, the sender may not be telling the truth or may inadvertently enter an otherwise valid entry for a phone number or card number. In this manner, a false name may appear on the recipient's caller identification display device 14b.

Figure 2:
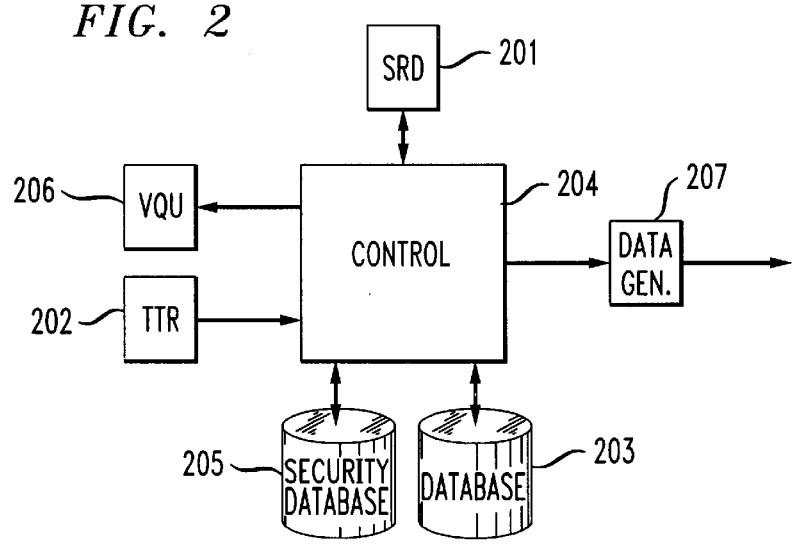
FIG. 2 is a block schematic diagram of translator apparatus.
Figure 3:
FIG. 3 is a drawing showing one suggested form for entry of data of a first key, a selection, if necessary, of an encryption system, a message and a public key, if necessary.

The present invention may be briefly described in principle as a solution to the limited terminal capabilities of apparatus 1 and 14. The present invention relates to providing translator apparatus for a user to enter data into a limited keyboard like keyboard 1a and place such data in encrypted form for transmission or in form for encryption at database 11. The translator apparatus may be portable or housed at database 11. The translator device accepts voice input or limited keypad input for outputting data representing an alphanumeric string. The translator is shown by FIG. 2. The output alphanumeric string is preferably output in the form represented by FIG. 3 comprising a first key, a selected encryption method choice, a message and a second key, if necessary. Then, a data encrypter shown by FIG. 4 that may be portable or located at database 11 receives the data output of the translator of FIG. 2, encrypts the message and forwards the encrypted message to destination terminal 14 or intelligent terminal or computer 12. If destined for terminal 14 with limited processing capability, the message can be intercepted at database 13 and provided as a verified, signed display at display 14b.

Translators for translating voice input to alphanumeric data output are generally known. A voice query unit 206 requests a response. A speech recognition device 201 receives speech input as a response and recognizes a vocabulary of utterances regardless of the person originating the utterance. The speech recognition device 201 including a controller 204 comprises a microphone which receives the signals, a processor 204 compares the signals with a database 203 and outputs the spoken utterance as a data signal via data generator 207. Typically, the utterance received is responsive to a voice initiated query from a simulated voice query unit 206.

Also, devices are known which accept input and, with increasing data input, can recognize the input as the input matching particular data in a database. Referring to FIG. 2, a data translator according to the present invention is shown. A touchtone (two tone) or dial pulse receiver 202 is shown. Secure database 205 may have a private key and other secure data included therein. The user may continue to "dial" in their key until not only the controller recognizes the key as a match but awaits entry of the entire key to verify the owner of the key.

If the user has not already predeposited their key in secure database 205, the user may enter keypad entries according to other schemes to record the entries despite the limited keypad size. In one such arrangement, two keypad entries signal a 1/144 code for entering alphanumeric characters. In another, since the keypad typically has at most one of four choices, for example, "2", "a," "b" or "c," the user can efficiently signal the choice by entering the choice more than once and such as twice for "a", three times for "b" and signaling the termination of the selection by a # sign. Other arrangements and codes have been developed as well for entering data by dial pulse or touchtone keypad.

Once the entered data is recognized by either entry and matching with a secure database 205 or by other means, the data is output by data generator 207 in appropriate format for reception by a data encrypter. The format should resemble the format of FIG. 3 a string of serial data which may be interrupted by spacers or of predetermined format. The first key which may comprise alphanumeric characters in predetermined sequence is output as data field 301. The first key 301 may be followed, if necessary, by an algorithm selection code 302 such as PGP for pretty good encryption or choice 1 of perhaps 10 or more choices ( or another choice might be secret agent, SA or code choice 2). The message field 303 may have predetermined or practically unlimited length and should be terminated by a predetermined indicator of message termination such as a pound sign. The second key entry field 304 may be required depending on the algorithm choice and the assumed knowledge of the recipient.

Figure 4:
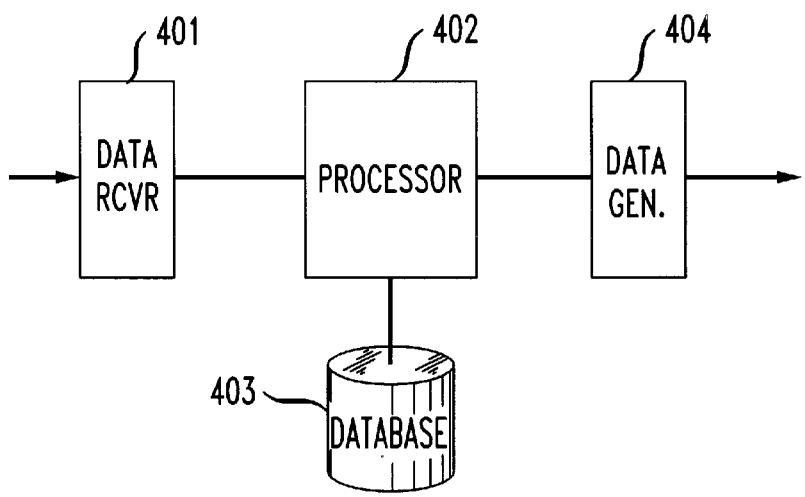
FIG. 4 is a functional block diagram or flowchart of message encryption apparatus for receiving the data entered according to FIG. 3, encrypting the message portion according to the encryption selection and forwarding at least the encrypted message to a remote location.

FIG. 4 represents a block diagram of an encryption device according to the present invention. The device appears very close in structure to FIG. 2 because the functional requirements are practically identical. The data receiver 401 receives the data stream formatted according to FIG. 3, processor 402 reads the encryption method choice and looks to database 403 for the algorithm. Database 403 stores many, if not all, the possible algorithm choices and may be a shared network resource. Referring to FIG. 1, this database 403 as well as databases 203 and 205 of FIG. 2 may be located at known database 11 and associated with a telecommunications switch 5 or an Internet server 6. Data processor 402 performs the retrieved encryption algorithm on message data 303 and data generator 404, responsive to processor 402, outputs encrypted message data and control data. The control data may include the algorithm choice and the second key 304 depending on the circumstances.

Figure 5:
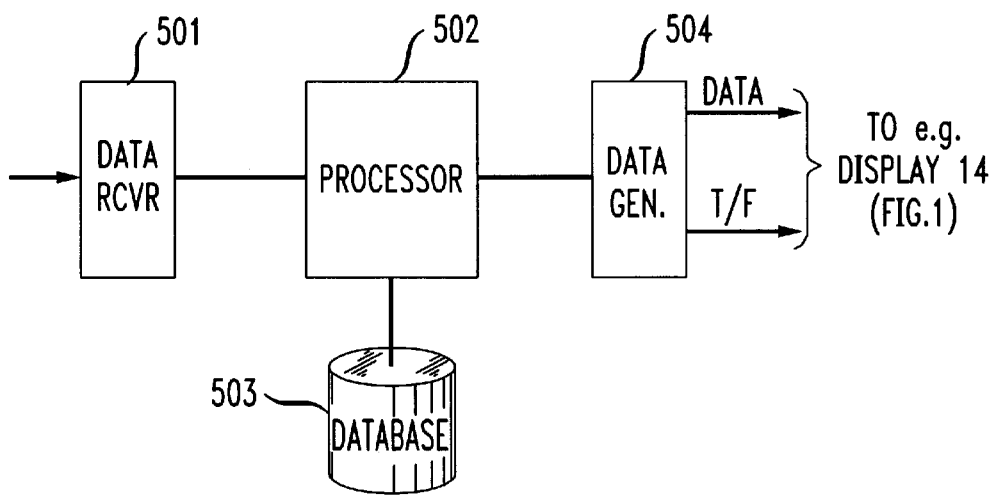
FIG. 5 is a functional block diagram or flowchart of message decryption and sender authentication apparatus which may be provided by a user or shared via the telecommunications network.

Now referring again to FIG. 1, the output data of the data generator may be provided via database 11 through the Internet or the PSTN cloud to a terminating switch 10 and database 12. Referring to FIG. 5, there is shown message decrypter and signature authentication apparatus that may be shared by users of the telecommunications network. The apparatus comprises a message data receiver 501, a processor 502, a secure database for storing decryption algorithms by type and a data generator for outputting toward a display 14 (FIG. 1) decrypted data and an indication of signature verification. According to the present invention, the received data may be decrypted and verified at a location of database 13 to a called party via display 14b or displayed at terminal 12 on display 12b with local processing at terminal 12. For example, if the calling party has transmitted their name to the called party 14, the calling party's name can be verified as being the name of the caller on the called party's display 14b. In other words, not only is the entered name at terminal 1 displayed at terminal display 14b, the identity of the caller is verified by use of personal encryption performed by the translation/encryption apparatus of the present invention. The display 14b may be caused to show the decrypted message data, for example, caller identity data such as their phone number and name, and be caused to flash or change color or otherwise indicate that the signature to the data is authentic via true/false (T/F) data output of data generator 504 responsive to processor 502.

Thus there has been shown and described a secure telecommunications data transmission apparatus and method which provides a means for securing data when the user of the public switched telecommunications network is confronted with limited data transmission and encryption capabilities. Other variations may come to mind to the reader of the present application; for example, processors/controllers 204, 402 and 502 may be so-called secure processors and memories 205, 403 and 503 may be secure memories. Preferably, these may be integrated with their associated secure processors so that any attempts at theft of secure data such as private encryption keys and algorithms will result only in destruction of the secure elements themselves and no private data can be read at ports between processors and respective memories. United States patent applications and patents discussed herein should be deemed to be incorporated by reference as to their entire contents, especially, for any such contents deemed to be essential to an understanding of the present invention. The method and apparatus for secure data transmission described herein should only be deemed to be limited in its scope of invention by the claims which follow.

What I claim is:

1. Secure data transmission apparatus for securing message data for transmission comprising:

a data receiver for receiving data representing a first key, an encryption algorithm choice and a message;

a database for storing a plurality of algorithms for encrypting data;

a processor, responsive to the data receiver, for encrypting the received message in accordance with a selected one of the plurality of algorithms; and a data transmitter for outputting the encrypted message.

2. Apparatus according to claim 1 wherein said data transmitter further outputs data indicating said algorithm choice.

3. Apparatus according to claim 1 wherein said data transmitter further outputs a second key.

4. Apparatus according to claim 1 wherein said data transmitter further outputs data indicating said algorithm choice and a second key.

5. Apparatus according to claim 1 wherein said processor and said database are integrated as one unit and are secure.

6. Apparatus according to claim 1 wherein said database stores private keys and said data receiver receives dual tone multi-frequency signals, at least one signal representing one of a number and a plurality of letters, said processor receiving a sequence of said signals until a match is achieved with a unique, stored private key.

7. Apparatus according to claim 6 wherein said processor requires input of a signal sequence comprising all number or character elements of a private key for private key verification.

8. A method of securing data for transmission comprising the steps of:

receiving a first key;

receiving data representing a choice of encryption algorithm;

retrieving the chosen encryption algorithm;

receiving message data; and encrypting the message data via the chosen encryption algorithm.

9. A method according to claim 8 further comprising the step of outputting data indicating said algorithm choice.

10. A method according to claim 8 further comprising the step of outputting a second key.

11. A method according to claim 8 further comprising the step of outputting data indicating said algorithm choice and a second key.

12. A method according to claim 8 further composing the step of securing an encryption processor and an associated database as one integrated unit.

13. A method according to claim 8 further comprising the steps of storing private keys and receiving dual tone multi-frequency signals, at least one signal representing one of a number and a plurality of letters, and receiving a sequence of said signals until a match is achieved with a unique, stored private key.

14. A method according to claim 13 further comprising the step of requiring input of a signal sequence comprising all number or character elements of a private key for private key verification.

15. Secure data transmission apparatus for translating an input string of received signals into a first encryption key comprising:

a secure database for storing a plurality of user encryption keys, each user key comprising a string of alphanumeric characters;

a data receiver for receiving the string of received signals, each received signal of the signal string providing incomplete data as to the identity of an alphanumeric character;

a processor for matching each received signal by received signal data representing the first encryption key with data representing the plurality of user encryption keys;

and a data generator for outputting data representing a selected one of the user encryption keys as the first encryption key when all the received signals match said selected one key.

16. A method for translating an input string of received signals into a first encryption key comprising the steps of:

receiving a string of received signals, each received signal of the signal string providing incomplete data as to the identity of an alphanumeric character;

storing a plurality of first encryption keys in a secure database;

matching each received signal with data of the first encryption keys of the secure database; and outputting data representing a selected first encryption key when all the received signals match the first encryption key.

17. A method for decrypting data and authenticating a sender's identity comprising the steps of:

receiving an encrypted message and data representing a choice of an algorithm;

decrypting said message according to the chosen algorithm;

authenticating the identity of the sender; and generating data representing the decrypted message and authenticity of the message for display.

18. A method for decrypting data according to claim 17 wherein said decrypted message comprises sender identification data and said authenticity is indicated by one of a true and a false indicator.

19. Apparatus for decrypting data and authenticating a sender's identity comprising:

a data receiver for receiving an encrypted message and data representing a choice of an algorithm;

a processor for decrypting said message according to the chosen algorithm and authenticating the identity of the sender; and a data generator for generating data representing the decrypted message and authenticity of the message for display.

20. Apparatus for decrypting data according to claim 19 wherein said data generator generates decrypted message data comprising sender identification data and data authenticating the identity of the sender by one of a true and a false indicator.

21. Apparatus for translating an input string of received signals into a first encryption key, the apparatus comprising:

a secure database for storing a plurality of user encryption keys, each user key comprising a string of alphanumeric characters;

a data receiver for receiving the string of received signals, each received signal of the string of received signals providing incomplete data representing the identity of the string of alpha numeric characters, said string of alpha numeric characters representing at least one of the plurality of user encryption keys;

a processor for matching each received signal by received signal data representing the first encryption key with data representing said at least one of the plurality of user encryption keys; and a data generator for outputting data representing a selected one of the user encryption keys as the first encryption key when all the received signals match said at least one of the plurality of user encryption keys.

\* \* \* \* \*